United States Patent
Doshi et al.

(10) Patent No.: US 10,229,147 B2
(45) Date of Patent: Mar. 12, 2019

(54) ASSESSING COMPRESSED-DATABASE RAW SIZE

(75) Inventors: Lyric Pankaj Doshi, Cambridge, MA (US); Finale Doshi-Velez, Cambidge, MA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 1471 days.

(21) Appl. No.: 13/369,990

(22) Filed: Feb. 9, 2012

(65) Prior Publication Data

US 2013/0212075 A1 Aug. 15, 2013

(51) Int. Cl.
G06F 17/30 (2006.01)
(52) U.S. Cl.
CPC .............. G06F 17/30339 (2013.01)
(58) Field of Classification Search
CPC ................. G06F 17/30; G06F 17/00
See application file for complete search history.

(56) References Cited

U.S. PATENT DOCUMENTS

| | | | | |
|---|---|---|---|---|
| 5,592,667 | A * | 1/1997 | Bugajski | G06F 17/3061 |
| 7,895,247 | B2 * | 2/2011 | Hankin | G06F 11/3409 |
| | | | | 707/812 |
| 8,229,876 | B2 * | 7/2012 | Roychowdhury | G06K 9/6223 |
| | | | | 706/54 |
| 2003/0208488 | A1 * | 11/2003 | Perrizo | G06F 17/30961 |
| 2004/0203420 | A1 * | 10/2004 | Rick | G01S 5/0009 |
| | | | | 455/67.11 |
| 2005/0097130 | A1 * | 5/2005 | Hankin | G06F 11/3409 |
| 2008/0059492 | A1 * | 3/2008 | Tarin | 707/100 |
| 2008/0077570 | A1 * | 3/2008 | Tang et al. | 707/5 |
| 2011/0055140 | A1 * | 3/2011 | Roychowdhury | G06K 9/6223 |
| | | | | 706/54 |
| 2011/0055192 | A1 * | 3/2011 | Tang et al. | 707/706 |

FOREIGN PATENT DOCUMENTS

JP 2002041570 A 2/2002
KR 20070009312 A 1/2007

OTHER PUBLICATIONS

Benz, Ursula, et al., "A Comparision of Several Algorithms for SAW Raw Data Compression," IEEE Transactions on Geoscience and Remote Sensing, vol. 33, No. 5, Sep. 1995, pp. 1266-1276 (11 total pages).*
Chen, Zhiyuan, "Building Compressed Database Systems," Doctorate Thesis, Cornell University, Aug. 2002, pp. i-151 (165 total pages).*
Habib, Ahsan, et al., "High Performance Query Operations on Compressed Database," ACM, International Hournal of Database Theory and Application, vol. 5, No. 3, Sep. 2012, pp. 1-14.*
Margaritis, Dimitris, et al., "NetCube: A Scalable Tool for Fast Data Mining and Compression," Carnegie Mellon University, School of Computer Science, Sep. 2001, pp. 1-11.*

* cited by examiner

Primary Examiner — Farhan M Syed

(57) ABSTRACT

A computer-implemented process to assess the raw size of a compressed database involves sampling a subset of the cells of the database. The raw sizes of the sampled cells in the subset are assessed. The raw size of the database is determined based on the raw sizes of the sampled cells.

17 Claims, 3 Drawing Sheets

ASSESSING COMPRESSED-DATABASE RAW SIZE

BACKGROUND

Databases are organized collections of data. Flat-file databases can include a collection of records, each record having data pertaining to multiple fields or parameters. A flat-file database can be represented as a table in which the rows correspond to records and the columns correspond to fields. The intersection of a record (row) and field (column) is termed a "cell" and typically stores the value for a field parameter for a particular database record. Other database types, e.g., relational, hierarchical, and network databases, can have multiple related tables, each with records, fields, and cells.

Some databases have only a few cells, while others may have over a billion. The amount of data, e.g., in bytes, contained in databases can vary significantly. At the high end, some databases contain well over a petabyte of data. To reduce the amount of physical storage required for database, e.g., to reduce equipment costs, databases can be compressed. A compressed database can have a "compressed" size and a "raw" size. The "raw" size of a database generally corresponds to the amount of storage that would be required to store the compressed database in uncompressed (expanded) form.

DETAILED DESCRIPTION

The raw size of a compressed database may be of interest, e.g., to ensure sufficient available storage prior to expanding (decompressing) the database, or to meet the needs of a pricing model based on the raw size of the database. In either case, it may be desirable to assess the raw size of a compressed database without expanding the entire database, e.g., to avoid finding out "too late" that the available storage space is insufficient. Also, the amount of processing and time required to fully decompress a database scales roughly linearly with the number of cells; accordingly, the time and effort required to decompress a database, e.g., for determining licensing fees, can become burdensome for very large databases.

Figure 1:
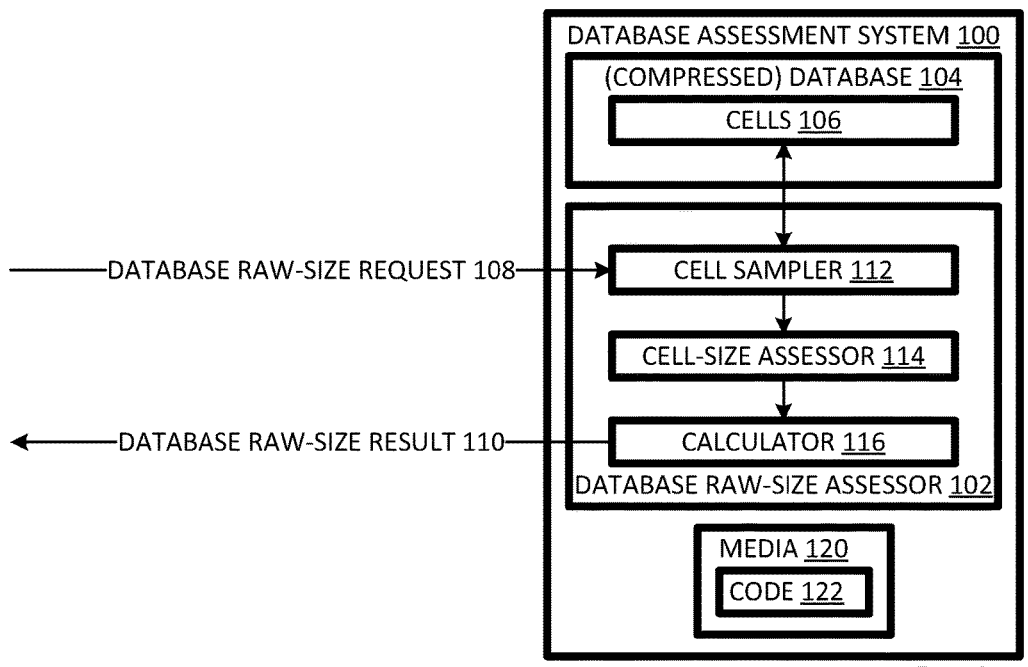
FIG. 1 is a schematic diagram of an example database assessment system.

FIG. 1 is a schematic diagram of an example database assessment system 100. According to the techniques described here, database assessment system 100 may be used to assess the raw size of a compressed database based on a sampling of the database cells. To this end, system 100 includes a database raw-size assessor 102 for assessing the raw size of a compressed database 104 based on a sampling of its cells 106. Database raw-size assessor 102 may respond to a database raw-size request 108 by providing a database raw-size result 110 indicating the raw size of the target database, e.g., database 104.

Database raw-size assessor 102 includes a cell sampler 112, a cell-size assessor 114, and a calculator 116. Cell sampler 112 select cells, e.g., a subset of cells 106, to be used in determining a database raw-size result 110. Cell-size assessor 114 may assess the size of each selected cell. Calculator 116 may calculate a database raw-size result 110 based on the assessed cell sizes. The functionality of database raw-size assessor 102 can be defined by computer-readable storage media 120 encoded with code 122. Code 122, when executed by a processor, can further provide for implementation of a database raw-size assessment process 200.

Figure 2:
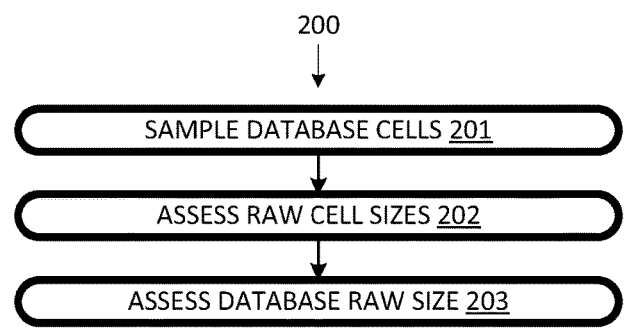
FIG. 2 is a flow chart of an example process.

Computer-implemented process 200, flow-charted in FIG. 2, may be implemented using database raw-size assessor 102. At 201, database cells are sampled, i.e., some but not all of the database cells are selected. At 202, the raw sizes of the selected cells are assessed. At 203, the raw size of the database is determined based, at least in part, on the raw sizes of the sampled cells.

Process 200 may scale to handle very large databases, e.g., with billions of cells. The number of samples required for an accurate assessment of database raw size does not vary according to the number of cells in a database; for example, the number of cells to be sampled to assess the raw size of a billion-cell database or a trillion-cell database may be the same as or similar to the number of cells to be sampled for a million-cell database. Thus, process 200 may benefit relatively larger databases to a greater degree than relatively smaller databases.

To increase a confidence level associated with the accuracy of a database raw-size assessment, the sampling of database cells may be random. "Random", as the term is used herein, encompasses "pseudo-random". Random sampling minimizes the likelihood of inaccuracies due to artifacts in the database data. Random sampling can be achieved, for example, using physical devices (such as dice), noise, pseudo-random number generators, and random-number tables. In some examples, deterministic and other forms of non-random sampling may be used.

Random sampling can include self-weighting sampling, stratified sampling, and cluster sampling. As applied herein, "self-weighting sampling" implies that every cell in the database has an equal chance of being selected as a sample; self-weighting sampling includes "simple random sampling", which involves selecting so that all samples have an equal chance of being selected from the entire population. Stratified sampling involves selecting independent samples from a number of subpopulations, groups, or strata within the population. Cluster sampling involves selecting the sample units in groups; for example, the groups can correspond to records.

Despite the scaling and other efficiency advantages that may generally be provided by process 200, there are situations in which it may be advantageous to simply decompress the entire database rather than sample. For example, for databases below some threshold cell count, the increased accuracy achieved by decompressing the entire database may outweigh small gains in efficiency achieved by sampling. Even for large databases, there may be cases where the variance in cell sizes is so great that raw database size may not be assessed with sufficient confidence using sampling for some purposes.

Figure 3:
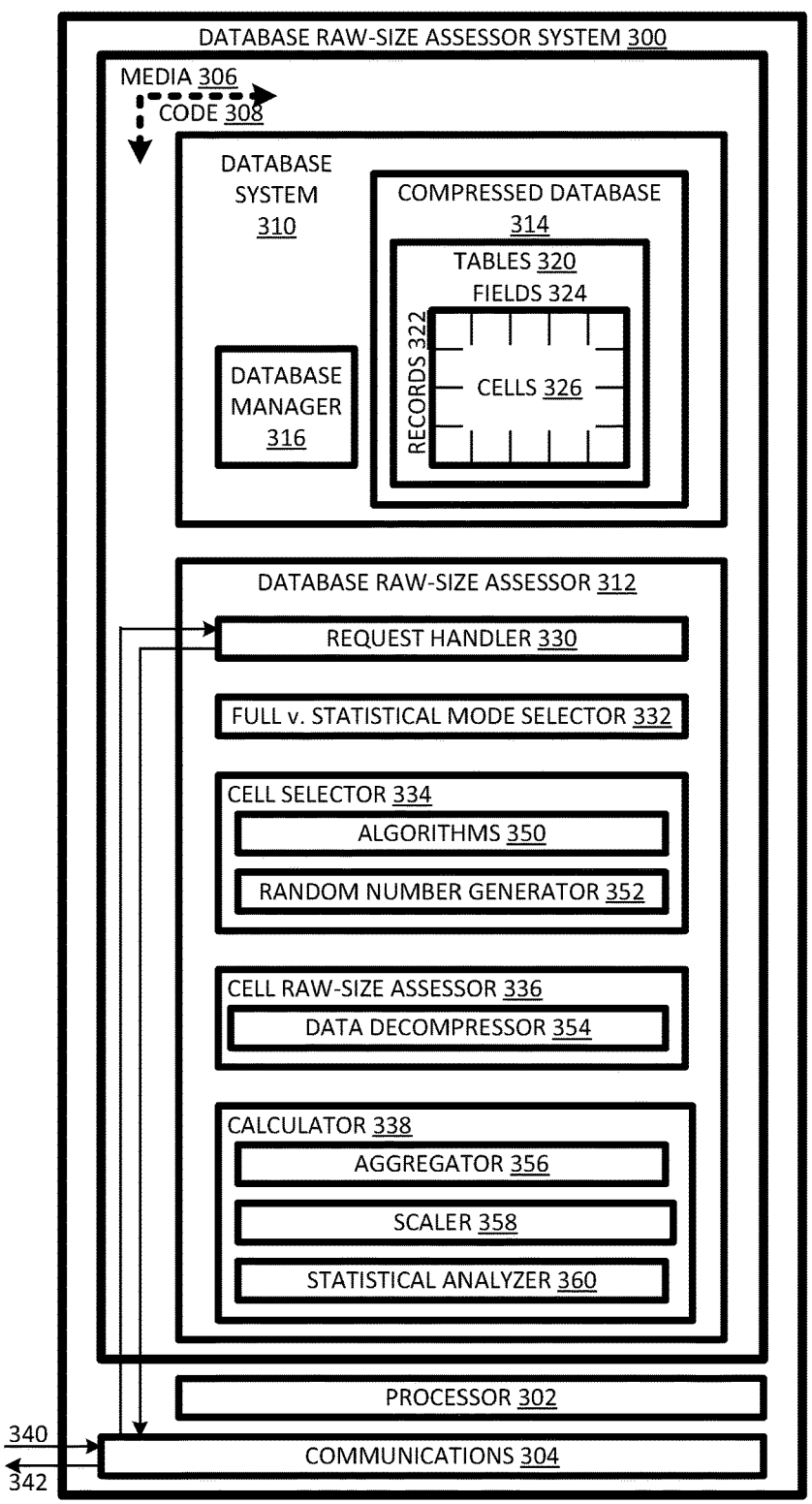
FIG. 3 is a schematic diagram of an example database raw-size assessor system.

Accordingly, a database raw-size assessor system 300, shown in FIG. 3, provides for determining whether a full decompression approach or a sampling approach should be used to assess a raw size for a compressed database. Database raw-size assessor system 300 is a programmed hardware system including a processor 302, communication devices 304, and non-transitory computer-readable storage media 306. Storage media 306 is encoded with code 308 representing data, including instruction-type data. Code 308 defines functionality for a programmed hardware database system 310 and a programmed hardware database raw-size assessor 312. By "programmed hardware" is meant a device or module for which the intended functionality is achieved when hardware, e.g., processor 302, executes code, e.g., code 308. The functional components, described below, of system 300 are programmed hardware.

Database system 310 includes a database 314 and a database manager 316. Database 314 is a relational database including related tables 320. Each table has records (rows) 322 and fields (columns) 324. Database 314 has cells 326, which are defined by the intersections of records 322 and fields 324 in tables 320. Database 314 is compressed, as are the contents and structures of tables 320, records 322, fields 324, and cells 326. In some examples, the fields (columns) of tables may be compressed and stored separately. Due to compression, database 314 consumes only a fraction of the storage space it would consume expanded (uncompressed). Database manager 316 manages database 314, e.g., it allows the structure and content of database 314 to be updated and responds to database queries by searching the contents of database 314, allowing for data entry into, and data retrieval from, database 314.

Database raw-size assessor 312 includes a request handler 330, a mode selector 332, a cell selector 334, a cell raw-size assessor 336, and a calculator 338. Request handler 330 receives database raw-size requests 340 using communication devices 304 and returns database raw-size results 342 using communication devices 304. Request handler 330 interacts with mode selector 332, cell selector 334, cell raw-size assessor 336, and calculator 338 in generating a database raw-size result 342 in response to a request 340.

Mode selector 332 selects an assessment mode for database raw-size assessor 312. The selectable modes include a "full" mode in which information from the entire database is used to determine database raw size and a "sampling" mode in which only a fraction, e.g., fewer than 5% or 10%, of the cells are examined to determine the raw size of the database. The sampling mode can have selectable sub-modes, including simple sampling, cluster sampling, row sampling, etc.

Within a sampling mode, different numbers of cells to be sampled can be selected, e.g., based on a previous outcome. For example, if a confidence level calculated based on the already-sampled cells is below a desired confidence level, more cells may be sampled. Similarly, if the spread (e.g., variance) of raw sizes resulting from a first set of samples indicates that more samples should be used to achieve a desired confidence level, the number of additional cells to be examined can be a function of the magnitude of the spread (e.g., variance).

Cell selector 334 is used to select cells to be used in determining database raw size. To this end, cell selector 334 includes selectable algorithms 350 providing for various procedures, e.g., simple or clustered random sampling, for selecting cells. In addition, cell selector 334 includes a random number generator 352 for use by algorithms 350, most of which are based on some form of random sampling to achieve accurate raw-size assessments.

Cell raw-size assessor 336 may determine the raw sizes of cells selected by cell selector 334. To this end, cell raw-size assessor 336 includes a data decompressor 354 to decompress individual cell contents of selected cells. In an alternative example, a cell raw-size assessor 336 assesses the raw sizes of compressed cells without decompressing their respective contents. For example, if the algorithm used for compression yields compressed cell sizes that are a monotonic function only of uncompressed cell sizes, the raw cell sizes may be computed from the compressed cell sizes even though the raw size of the database cannot be computed from the compressed size of the database, e.g., because the monotonic function is non-linear.

Calculator 338 may calculate a database raw-size result based on cell raw sizes. To this end, calculator 338 includes an aggregator 356 and a scaler 358. Aggregator 356 is used to combine, e.g., add or average, cell raw sizes to get an aggregate cell raw size for a selected set of cells. Scaler 358 may be used to scale the aggregate cell raw size to determine a total corresponding to all cells, i.e., the raw size of the database. For example, if 1% of the cells of database 314 are sampled, the aggregate (total) cell raw size can be multiplied by 100 to determine the database raw size.

In addition, calculator 338 can include a statistical analyzer 360 for statistically analyzing cell raw size data, e.g., to determine a variance and an associated confidence level. These statistical parameters can be used to determine whether or not additional cells are to be sampled and, if so, how many. For example, if the variance is high, the confidence level for the determined database raw size may be too low (e.g., for the requestor's purposes).

If the confidence level is determined to be only slightly too low, the number of additional cells to be sampled can be less than it would be if the confidence level is determined to be much too low. More specifically, the error bound given the desired confidence level and current variance in the data is checked to determine if it is within the requested error bound. If not, more cells may be sampled. The quantity of additional cells to be sampled may be related to how different the error is from the requested error bound. In some cases, an upper limit, e.g., 10,000 cells, can be imposed on an iteration's sample size to avoid overshooting excessively the number of cells for achieving the desired confidence level.

Figure 4:
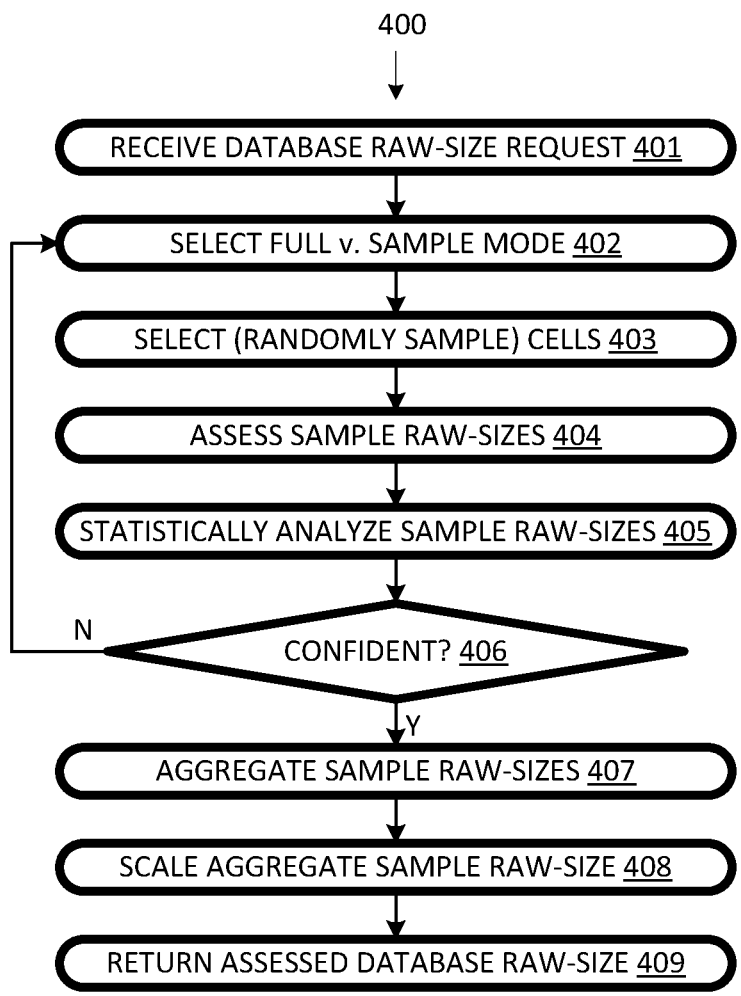
FIG. 4 is a flow chart of a process implementable using the system of FIG. 3.

A process 400, implementable using database raw-size assessor system 300, is flow charted in FIG. 4. At 401, a request for an assessment of the raw size of a compressed database is received, e.g., at request handler 330. At 402, an assessment mode is selected. In a first iteration of 402, the selection can be made based on the number of cells in the database to be assessed. For example, a threshold of 200,000 cells may be used. In this example, if the cell count is less that the threshold, the whole database may be decompressed; if the cell count is greater than or equal to 200,000 a sampling mode may be used.

At 403, sampling is effected in the sense that cells are selected (e.g., using cell selector 334) according to the mode selected at 402. If a "full" mode is selected, all cells are selected; in other words, the entire database is decompressed. If a sampling mode is selected, a subset of all cells is selected. For example, 1000 to 100,000, e.g., 10,000 cells can be selected, e.g., randomly.

At 404, the raw-sizes of the selected cells are respectively assessed, e.g., using cell raw-size assessor 336. Assessing cell raw size can be effectuated by decompressing each of the cells and determining the number of bytes represented by the uncompressed contents. Alternatively, the raw-size of a cell can be determined or estimated without decompressing the cell.

At 405, the raw cell sizes are statistically analyzed (e.g., using statistical analyzer 360) to evaluate a spread parameter, e.g., variance, for the selected cell population and a confidence level to be associated with an ensuing database raw-size assessment. Alternatively, a different statistical parameter can be evaluated. In cases where confidence level is not a concern, e.g., where one simply wants an estimate regardless of the associated confidence level, 405 may be omitted. If a minimum confidence level and an associated variance have been established, the determined variance or confidence level can be compared with the desired confidence level or variance at 406. If the established thresholds are not met, process 400 returns to 402 for a decision whether to sample additional cells.

For iterations of 402 after the first, a typical selection can be a repeat of the first. In other words, if the outcome of the first iteration of 402 was to select 10,000 cells, the outcome of the second and subsequent iteration of 402 can involve selecting additional sets of 10,000 cells. However, if the variance is only slightly above the desired variance, then a smaller number of additional cells may be chosen. Likewise, if the variance is considerably above the desired variance, then a larger sample may be selected. A cap, e.g., of 10,000, may be set to avoid excessive requests for more samples in the event that the first set was atypical.

In some cases, the selection mode at a non-first iteration of 402 may differ from the first iteration. For example, if an additional batch of cells would cause the total number of cells to exceed some threshold, e.g., between 1% and 10%, e.g., 5%, a full mode may be implemented. A rationale is that if the variance is excessive even though 5% or more of the cells have been sampled, then it is unlikely that additional samples will meet the associated confidence level. Therefore, the entire database can be decompressed to get a raw-size assessment with a 100% confidence level.

Once the desired confidence level criterion of 406 is met, the assessed raw-sizes are aggregated at 407 to yield a total or average raw size for the sampled population of cells. At 408, this aggregate raw-size is scaled to yield the desired database raw size. For example, if 10,000 samples were used for a 2,000,000-cell database, then the aggregate (total) sample raw size is scaled, e.g., multiplied by 200. Alternatively, an average sampled raw size can be multiplied by the number of cells in the database to yield the database raw size. At 409, the resulting database raw size can be returned to the requestor.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. Herein, a "processor" is a device, part of a device, or a combination of devices capable of manipulating data in accordance with computer instructions. Herein, a "communications device" is a device used for communications, input, or output. "Storage medium" and "storage media" refer to a system including non-transitory tangible material in or on which information is or can be encoded, e.g., so as to be readable by a computer. Herein, unless otherwise apparent from context, a functionally defined component of a computer is a combination of hardware and software executing on that hardware to provide the defined functionality.

Herein, a "database" is a data structure together with its contents; the data structure is arranged in records and fields; cells are the intersections of records and fields. A "database manager" is a program that provides for managing a database, e.g., modifying its structure and contents, and providing access to the database, e.g., by answering queries.

"Compressed" means re-encoded so that it consumes less space; decompressed means re-encoded back to its original form. The "compressed size" of a cell or database is the amount of storage space, e.g., in bytes, consumed by the cell or database in compressed form. The "raw size" of a cell or database is the amount of storage space, e.g., in bytes, that the cell or database does or would consume in uncompressed form. The raw size of a cell or database can be expressed in terms of the number of character bytes to be used to print the contents to a console. For example, the size of floating-point number "3.5" would be 3, while the size of the timestamp "14:31:01 PM 1-23-2001" would be 21.

Sampling is a process of selecting a subset of items, e.g., cells, from a full population, e.g., all cells in a database, to make an assessment regarding the full population. "Assess" encompasses "determining" and "estimating". Herein, "mean" refers to "arithmetic mean" as used by those skilled in the art to refer to a statistic parameter equal to the sum of values divided by the number of values. Like "range", "variance" is a measure of how far a set of values is spread out. The variance of random values can be computed as the arithmetic mean of the squares of the deviations of values from the arithmetic mean of the values.

Herein, "confidence level" corresponds to a likelihood that a population parameter is within a given range, i.e., "confidence interval". This confidence interval is defined as the inclusive interval $[x-z*s/sqrt(n)), x+z*s/sqrt(n)]$, where z=z score, which is directly mapped from the confidence level, n is the number of cells sampled, x is the sample mean, and s is the sample standard deviation. Therefore, error is defined as half the size of the full interval (i.e., distance from x to one of the end points) divided by x, or $(z*s)/(x*sqrt(n))$, after taking n samples. Once z, n, the mean and s are known for the sample, the expected error can be computed. If the expected error is higher than the error previously deemed satisfactory, more samples are taken to increase the magnitude of n, and to confirm or potentially increase the accuracy of s and x.

The illustrated and other described examples, as well as modifications thereto and variations thereupon are within the scope of the following claims.

What is claimed is:

1. A computer-implemented process comprising:
sampling, by a processor coupled to a storage medium, a subset of cells of a compressed database;
assessing cell raw storage sizes of the sampled cells, wherein the assessing of the cell raw storage sizes comprises;
statistically analyzing the cell raw sizes to determine a value of a statistical parameter collectively describing the sampled cells, the sampling being random; and
determining whether additional cells should be sampled to meet a predetermined confidence level; and
assessing a database raw storage size of the compressed database based on the assessing of the cell raw storage sizes to ensure sufficient storage prior to decompressing the compressed database.

2. A process as recited in claim 1 wherein a number of the additional cells to sample is based at least in part on the value of the statistical parameter.

3. A process as recited in claim 1 wherein the determining of whether additional cells should be sampled to meet a predetermined confidence level comprises determining whether to sample the additional cells or to select the entire compressed database based at least in part on the value of the statistical parameter.

4. A process as recited in claim 1 wherein the assessing of cell raw storage sizes includes decompressing the sampled cells without decompressing other cells of the database.

5. A system comprising:
a processor;
a cell sampler to select a subset of cells of a compressed database, wherein the raw storage sizes of the subset of cells to be sampled is based, at least in part, on a variance calculated based on previously sampled cells;
a cell-size assessor to assess respective cell raw storage sizes of the subset of cells; and
a calculator to assess a database raw storage size of the compressed database based on the cell raw storage sizes of the subset of cells.

6. A system as recited in claim 5 wherein the calculator includes:
an aggregator for aggregating the cell raw storage sizes to yield an aggregate raw storage size for the cell subset; and
a scaler to scale the aggregate raw storage size to yield the database raw storage size.

7. A system as recited in claim 5 wherein the calculator includes a statistical analyzer to evaluate a statistical parameter associated with the cell raw storage sizes, the sampling being random.

8. A system as recited in claim 5 further comprising a mode selector for selecting between:
a full mode in which all cells of the database are decompressed to assess the database raw storage size; and
a statistical mode in which less than 10% of the cells of the database are decompressed to assess the database raw storage size.

9. A non-transitory computer-readable storage medium storing instructions that, when executed by a processor, cause the processor to:
sample a subset of cells of a compressed database, wherein a size of the subset of cells to be sampled is based, at least in part, on a confidence level calculated based on previously sampled cells;
assess cell raw storage sizes of the sampled cells; and
determine a database raw storage size of the compressed database based on the assessment of the cell raw storage sizes.

10. A medium as recited in claim 9 wherein the determining the database raw storage size includes:
aggregating the cell raw storage sizes to obtain an aggregate cell raw storage size; and
scaling the aggregate raw storage size to yield the database raw storage size.

11. A medium as recited in claim 9 further storing instructions that cause the processor to:
statistically analyze the cell raw storage sizes to evaluate a confidence-related parameter to obtain a parameter value, wherein the sampling is random; and
determine whether to sample additional cells based at least in part on the parameter value.

12. A medium as recited in claim 11 wherein said instructions further cause said processor to determine how many additional cells to sample based in part on the parameter value.

13. A medium as recited in claim 9 wherein the size of the subset of cells to be sampled is based, at least in part, on a variance calculated based on previously sampled cells.

14. A medium as recited in claim 9 said assessment of cell raw storage sizes yields an average cell raw storage size, said processor being caused to determine database raw storage size based on said average cell raw storage size.

15. A system as recited in claim 5 wherein the raw storage size of the subset of cells to be sampled is based, at least in part, on a confidence level calculated based on previously sampled cells.

16. A process as recited in claim 1 wherein a size of the subset of cells to be sampled is based, at least in part, on a confidence level calculated based on previously sampled cells.

17. A process as recited in claim 1 wherein the raw storage size of the subset of cells to be sampled is based, at least in part, on a variance calculated based on previously sampled cells.

* * * * *